US011658595B2

(12) United States Patent
Simon et al.

(10) Patent No.: US 11,658,595 B2
(45) Date of Patent: May 23, 2023

(54) METHOD AND SYSTEM FOR CONTACTOR ACTUATION IN A TRACTION SYSTEM

(71) Applicant: Dr. Ing. h.c. F. Porsche Aktiengesellschaft, Stuttgart (DE)

(72) Inventors: Daniel Simon, Ludwigsburg (DE); Hermann Helmut Dibos, Remchingen (DE); Eduard Specht, Bruchsal (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 65 days.

(21) Appl. No.: 17/518,717

(22) Filed: Nov. 4, 2021

(65) Prior Publication Data

US 2022/0140760 A1   May 5, 2022

(30) Foreign Application Priority Data

Nov. 5, 2020   (DE) ...................... 10 2020 129 129.9

(51) Int. Cl.
| | |
|---|---|
| *H02M 7/5387* | (2007.01) |
| *H02P 21/00* | (2016.01) |
| *H02K 11/26* | (2016.01) |
| *H02K 11/27* | (2016.01) |

(52) U.S. Cl.
CPC ............. *H02P 21/00* (2013.01); *H02K 11/26* (2016.01); *H02K 11/27* (2016.01)

(58) Field of Classification Search
CPC ... H02M 7/53873; H02M 7/539; H02P 21/00; H02K 11/26; H02K 11/27
See application file for complete search history.

(56) References Cited

U.S. PATENT DOCUMENTS 10,086,709 B2   10/2018   Roberts et al.
10,340,813 B2   7/2019   Schumacher et al.
(Continued)

FOREIGN PATENT DOCUMENTS

DE   102011113798 A1   5/2012
DE   102014108667 A1   12/2015
(Continued)

OTHER PUBLICATIONS

Goetz et al., "Modular Multilevel Converter With Series and Parallel Module Connectivity: Topology and Control," Power Electronics, IEEE Transactions on Power Electronics, vol. 30, No. 1, 2015, pp. 203-215.
(Continued)

*Primary Examiner* — Cortez M Cook
(74) *Attorney, Agent, or Firm* — RatnerPrestia (57) ABSTRACT

A method for actuating contactors in a traction system. The traction system includes an AC battery, an electric motor, at least one peripheral unit, a plurality of voltage and current sensors, a plurality of contactors, which are arranged in electrical connections to the AC battery and to the electric motor and to the at least one peripheral unit, and a controller having a hardware-programmable processor unit on which a control program for actuating the contactors is configured at the start of operation. After the configuration, a fixed semiconductor circuit structure relating to the actuation of the contactors is available to the processor unit. The traction system has multiple modes of operation. A respective mode of operation is predefined by a general vehicle controller. A respective mode of operation has a plurality of states formed by at least one respective target state and at least one intermediate state.

12 Claims, 3 Drawing Sheets

(56) References Cited

U.S. PATENT DOCUMENTS

| | | | |
|---|---|---|---|
| 11,088,550 | B2 | 8/2021 | Jaensch et al. |
| 2016/0276919 | A1* | 9/2016 | Geyer .................. H02M 7/539 |
| 2017/0005371 | A1 | 1/2017 | Chidester et al. |
| 2017/0179844 | A1* | 6/2017 | Schumacher ..... H02M 7/53873 |
| 2017/0282747 | A1 | 10/2017 | Wang et al. |
| 2018/0043783 | A1 | 2/2018 | Tabatowski-Bush et al. |
| 2018/0072179 | A1 | 3/2018 | Burkman et al. |

FOREIGN PATENT DOCUMENTS

| | | |
|---|---|---|
| DE | 102017105993 A1 | 10/2017 |
| DE | 102017113003 A1 | 12/2017 |
| DE | 102018106306 A1 | 9/2019 |

OTHER PUBLICATIONS

"Automotive ECU design based on FPGA fully complies with AUTOSAR and ISO 26262 standards", Jul. 9, 2020, pp. 1-4, XP55888116, retrieved on the Internet: https://www.fpgakey.com/technology/details/automotive-ecu-design-based-on-fpga-fully-complies-with-autosar-and-iso-26262-standards, [retrieved on Feb. 7, 2022].

Klönne, A., et al., "Systematic approach of rapid prototyping for EC drives in automotive applications", 2004, pp. 2245-2250, XP010739623, Jun. 20-25, 2004, 2004 35th Annual IEEE Power Electronics Specialists Conference, Aachen, Germany.

\* cited by examiner

METHOD AND SYSTEM FOR CONTACTOR ACTUATION IN A TRACTION SYSTEM

CROSS-REFERENCE TO RELATED APPLICATION

This application claims priority to German Patent Application No. 10 2020 129 129.9, filed Nov. 5, 2020, the content of such application being incorporated by reference herein in its entirety.

FIELD OF THE INVENTION

The present invention relates to a method for actuating contactors in a traction system. Further, a system on which the method is carried out is presented.

BACKGROUND OF THE INVENTION

AC batteries are used in the traction system in electric vehicles, one or more phases for supplying AC current to an electric motor being produced by means of continually changing interconnection of DC voltage sources. Contactors controlled by a controller are arranged within the traction system for the purpose of breaking and making electrical connections between various components.

US 2018/0043783 A1, which is incorporated by reference herein, discloses a vehicle system that comprises a controller, a relay and a coil of a contactor. The relay is configured such that in the closed state it transfers current between a traction battery and an electrical load. The controller operates a switch such that a flow of current from the traction battery through the coil and the switch, bypassing the relay, causes the relay to close and pre-charging of the load to be able to take place.

US 2017/005371A1, which is incorporated by reference herein, describes systems and methods for storing energy for use by an electric vehicle. The systems comprise battery strings that can be connected to a vehicle power supply independently of one another by way of a respective controllable switch.

US 2018/0072179 A1, which is incorporated by reference herein, discloses a high-voltage locking system comprising a first module having a contactor and a shunt connection and also a second module having first and second circuits that are connected to the first module by way of first and second lines. The second module disconnects as a reaction to an impedance of the shunt exceeding a threshold value, a signal for switching the contactor.

SUMMARY OF THE INVENTION

During operation of the electric vehicle, there may be a desire for various operating states of the traction system, which necessitate different interconnection of the AC battery, electric motor and peripheral connections. The connection between the AC battery and the electric motor is thus broken or made by contactors depending on whether for example charging at a charging column or discharge of the AC battery for the purpose of traction is taking place.

A respective hardware interconnection of components of the traction system, hazard and risk analyses and functional safety regulations result in demands on the actuation of the contactors for a respective operating state, which contactors can have different normal positions (open or closed) and different switching times, for example, depending on type.

Against this background, described herein is a method for actuating contactors in a traction system in which different operating states of the traction system prompt a respective interconnection of components of the traction system brought about by the contactors to be effected. This is intended to involve a hardware solution being found on the basis of safety-relevant considerations. Further, the intention is to present a system on which the method is carried out.

A method for actuating contactors in a traction system, in which the traction system comprises an AC battery, an electric motor, at least one peripheral unit, a plurality of voltage and current sensors, a plurality of contactors, which are arranged in electrical connections to the AC battery and to the electric motor and to the at least one peripheral unit, and a controller having a hardware-programmable processor unit on which a control program for actuating the contactors is configured at the start of operation and, after the configuration, a fixed semiconductor circuit structure relating to the actuation of the contactors is available to the processor unit. The traction system has multiple modes of operation, wherein a respective mode of operation is predefined by a general vehicle controller. A respective mode of operation has a plurality of states formed by at least one respective target state and at least one intermediate state, wherein a respective state is adopted by the traction system by means of a respective command as a result of a respective transition between the respective states. The traction system is assigned a respective switching position of the contactors for the respective state in a switching table. A closing duration and an opening duration are stored for a respective contactor in a table of switching times. The respective state is reached by means of a sequence firmly predefined by a state machine, wherein the state machine is realized by the control program, and wherein the contactors are controlled by the control program according to the switching table using the table of switching times.

A hardware-programmable processor of this kind is advantageously fully testable, allowing incorrect actuations to be precluded by test series in advance. It is additionally possible to ensure both temporally defined sequences and sequences having a defined succession, e.g. on entry into a safe state. Using the latter, the method according to aspects of the invention safely assigns the respective contactor switching states, i.e. open or closed, to a respective state of the traction system at any time and therefore meets all safety demands on a controlled traction system as a result of hazard and risk analyses and also functional safety.

The closing duration and the opening duration of a respective contactor are taken for example from datasheets containing specifications relating to the type of the respective contactor. The traction system can contain different types of installed contactors (see Tab. 2), for example, which are connected in either normally closed, or NC, or normally open, or NO, fashion at the start of operation, that is to say with a previously deenergized state. As such, so-called active shorting contactors, which are used for actively shorting the electric motor, are of NC design, whereas a respective motor phase contactor assigned to a respective phase voltage of the AC battery is of NO design. For reasons of circuitry (to avoid harmful current or voltage pulses), an active shorting contactor now needs to be opened first before a respective motor phase contactor closes. An opening or closing operation is associated with a respective duration, however, which also varies depending on the brand of the contactor. According to aspects of the invention, however, these respective opening durations and closing durations are advantageously stored in the table of switching times (see Tab. 3) and are implemented by the control program for actuating the contactors.

An example of an intermediate state that should be mentioned is a sensor check or self-test on a current sensor to ensure that for example an overcurrent circuit dependent on this current sensor works.

In an analysis relating to functional safety, it was identified, in particular for the actuation of the plurality of contactors, that the actuation needs to be coordinated in terms of timing and on the basis of the respective state of the plurality of contactors. A software-oriented hardware implementation based on the method according to aspects of the invention is advantageous in this regard, since adaptations in the state machine or the switching table to suit a software-controlled general vehicle system and/or a software-controlled AC battery, for example a modular multilevel converter with series and parallel connectivity, for example described in Goetz, S. M.; Peterchev, A. V.; Weyh, T., "Modular Multilevel Converter With Series and Parallel Module Connectivity: Topology and Control," Power Electronics, IEEE Transactions on, vol. 30, no. 1, pp. 203,215, 2015. doi: 10.1109/TPEL.2014.2310225, can be made easily, without complication and on a purely software-oriented basis. This article is incorporated by reference herein.

In one embodiment of the method according to aspects of the invention, the modes of operation with the respective target state are chosen from at least the following list: mode of operation "POWER_UP_DOWN" with target state "Idle" after prior intermediate state "Power sensor check", mode of operation "MOTOR" with target state "Motor" after prior "Motor sensor check", mode of operation "DC_CHARGING" with target state "DC charging" after prior "DC power sensor check", mode of operation "AC_CHARGING" with target state "AC charging" after prior "AC power sensor check", mode of operation "ERROR" with target state "Init" after prior intermediate state "Idle Error", mode of operation "SHUTDOWN" with target state "Off" after prior intermediate state "PowerDown".

In a further embodiment of the method according to aspects of the invention, the at least one peripheral unit is chosen from the following list: isolation watchdog, low-voltage DC-DC voltage converter, charging connector, CAN bus.

In yet a further embodiment of the method according to aspects of the invention, the processor unit chosen is an FPGA. FPGA is an abbreviation for "Field Programmable Gate Array". Respective processor programming is configurable on an FPGA for example when the electric vehicle having the contactor actuation according to aspects of the invention is started, said programming being deemed a hardware implementation and being executable in a correspondingly safe manner. The state machine is realized on the FPGA as a hardware program by the control program using a VHDL module. VHDL stands for "Very High Speed Integrated Circuit Hardware Description Language", also "VHSIC Hardware Description Language", and was developed so as, when implemented on a hardware-programmable processor, to execute system sequences described as a state machine in accordance with a hardware control.

In a further embodiment still of the method according to aspects of the invention, the hardware-programmable processor unit comprises at least one additional microprocessor core on which a meta-state machine, which is on a higher level than the state machine realized by the hardware-programmed control program, is executed as a software program. The meta-state machine realized by the software program changes between the aforementioned intermediate states and target states, while the hardware-programmed control program carries out the contactor control operations required therefor. On the one hand, the state machine realized by the hardware-programmed control program thus ensures that the configuration of the contactor actuation is inherently consistent and that physical properties, for example switching times, are taken into consideration. On the other hand, the meta-state machine is provided with respective information relating to a system context, i.e. it has access to measured values from current sensors, receives feedback signals from special contactors configured for this purpose, monitors a respective supply voltage for a respective contactor. This respective information can be used by the meta-state machine to influence the transitions that the state machine for the contactor actuation prompts between states by for example drawing conclusions about changing closing durations or opening durations from the feedback signals from the respective contactors configured for this purpose and making changes in the table of switching times. The meta-state machine monitors a context of the contactor actuation, i.e. whether time delays or duration differences arise for the respective transitions. This can be used to infer the presence of a contactor adhesive, for example. If there is an error, the meta-state machine can change from the currently adopted state to an error state at any time and independently. The contactor actuation needing to be performed in this case is then again undertaken by the hardware-programmed control program, entirely without further activity by the software-based meta-state machine, which means that there is always the certainty of the contactors provided for this purpose in the switching table being actuated.

In yet a further embodiment still of the method according to aspects of the invention, the control program for actuating the contactors is configured by a program loader on the hardware-programmable processor unit at the start of operation. The program loader respectively providing the hardware-programmable processor unit with the control program afresh at the start of operation can be for example a first stage boot loader, abbreviated to FSBL.

Further, a system for actuating contactors in a traction system is claimed, in which the traction system comprises an AC battery, an electric motor, at least one peripheral unit, a plurality of voltage and current sensors, a plurality of contactors, which are arranged in electrical connections to the AC battery and to the electric motor and to the at least one peripheral unit, and a controller having a hardware-programmable processor unit. The hardware-programmable processor unit is designed to configure a control program for actuating the contactors at the start of operation, as a result of which, after the configuration, a fixed circuit structure relating to the actuation of the contactors is available to the processor unit. The traction system has multiple modes of operation, wherein a respective mode of operation is predefined by a general vehicle controller. A respective mode of operation has a plurality of states, wherein the plurality of states are formed by at least one respective target state and at least one intermediate state. A respective state from the plurality of states is adoptable by the traction system by means of a respective command as a result of a respective transition between the respective states. The traction system is assigned a respective switching position of the contactors for a respective state in a switching table. A closing duration and an opening duration are stored for a respective contactor in a table of switching times. The respective state is reachable by means of a sequence firmly predefined by a state machine, wherein the state machine is realized by the control program, and wherein the contactors are controllable by the control program according to the switching table using the table of switching times.

In one refinement of the system according to aspects of the invention, the modes of operation with the respective target state and at least one respective intermediate state are chosen from at least the following list: mode of operation "POWER_UP_DOWN" with target state "Idle" after prior intermediate state "Power sensor check", mode of operation "MOTOR" with target state "Motor" after prior "Motor sensor check", mode of operation "DC_CHARGING" with target state "DC charging" after prior "DC power sensor check", mode of operation "AC_CHARGING" with target state "AC charging" after prior "AC power sensor check", mode of operation "ERROR" with target state "Init" after prior intermediate state "Idle Error", mode of operation "SHUTDOWN" with target state "Off" after prior intermediate state "PowerDown".

In a further refinement of the system according to aspects of the invention, the at least one peripheral unit is chosen from the following list: isolation watchdog, low-voltage DC-DC voltage converter, charging connector, CAN bus.

In yet a further refinement of the system according to aspects of the invention, the processor unit is an FPGA and the state machine is realized on the FPGA as hardware by the control program using a VHDL module.

In a further refinement still of the system according to aspects of the invention, the hardware-programmable processor unit comprises at least one additional microprocessor core on which a meta-state machine, which is on a higher level than the state machine realized by the hardware-programmed control program, is executable as software.

In yet a further refinement still of the system according to aspects of the invention, the system additionally comprises a program loader. The program loader is designed to configure the control program for actuating the contactors on the hardware-programmable processor unit at the start of operation.

Further advantages and refinements of the invention will become apparent from the description and the accompanying drawing.

It goes without saying that the features cited above and those yet to be explained below can be used not only in the respectively indicated combination but also in other combinations or on their own without departing from the scope of the present invention.

DETAILED DESCRIPTION OF THE INVENTION

Figure 1:
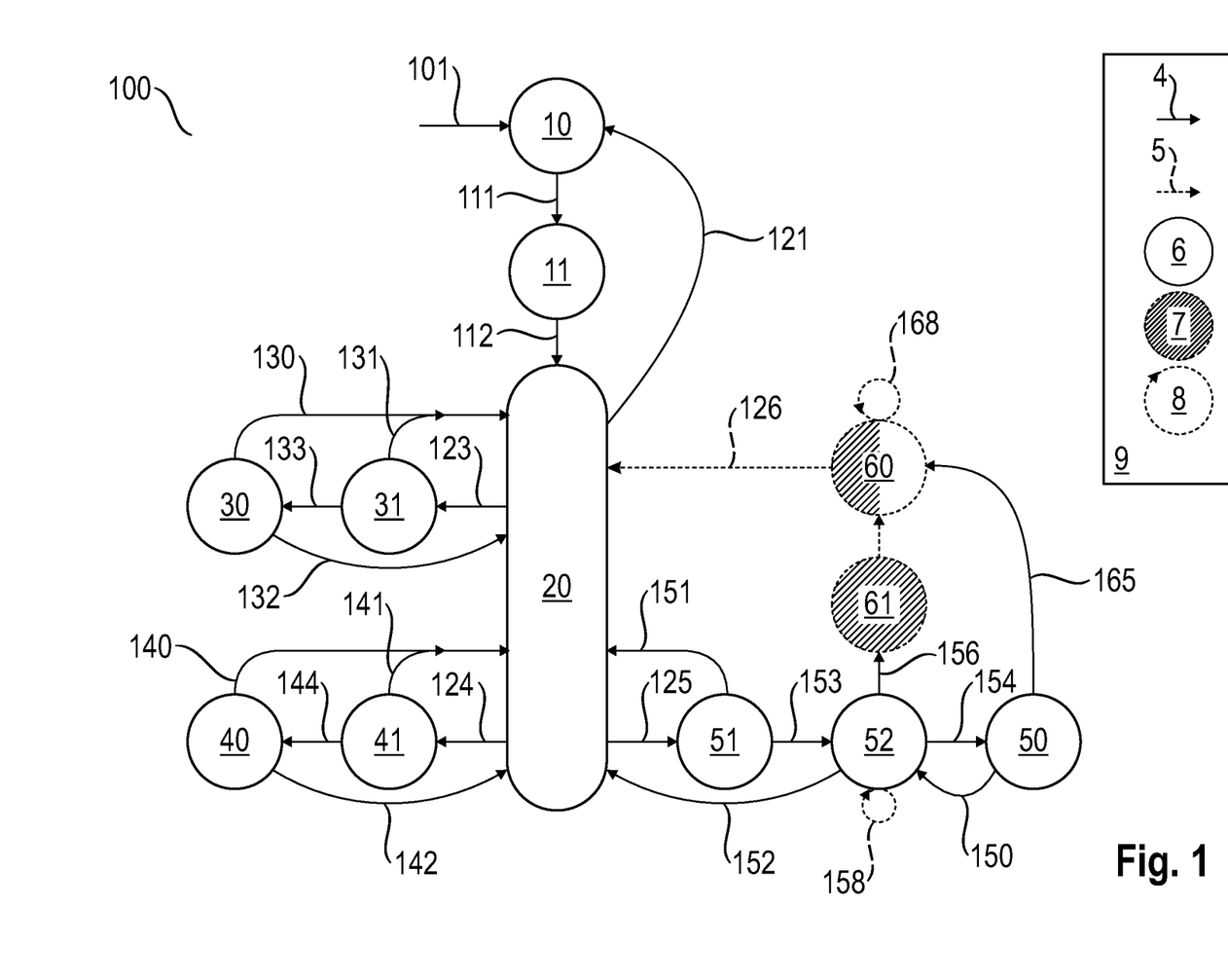
FIG. 1 shows a diagram of a state machine for contactor actuation in an embodiment of the method according to aspects of the invention.

FIG. 1 shows a diagram of a state machine 100 for contactor actuation in an embodiment of the method according to aspects of the invention. In an associated legend 9, a solid arrow 4 corresponds to a transition between two states due to a command from the state machine, a dashed arrow 5 corresponds to a transition due to a processor command, a circle 6 corresponds to a stable state, a shaded dashed circle 7 corresponds to a transition state and a dashed circle 8 corresponds to a blocked delay state with a self-selected duration. The state machine 100 begins, in a mode of operation "POWER_UP_DOWN", with an input action 101, which prompts a state "PowerOnReset" 10 to be adopted. A command "PowerUp (or Idle)" 111 prompts a change to a state "$CSC_P$" 11, in which a test on a current sensor for the power supply is performed. Next, with the power supply switched on, a further command "PowerUp (or Idle)" 112 prompts a change to the state "Idle" 20, from which a command "Powerdown" allows a return to the state "PowerOnReset" 10. Having been switched on, the traction system waits in the state "Idle" 20 for a stipulation from a general vehicle system to execute a respective mode of operation. Stipulation of a mode of operation "AC_CHARGING" results in a command "AC charging" 123 prompting a change to a state "$CSC_A$" 31, in which a test on a current sensor for a charging operation for the AC battery using AC current is performed. In the event of an error, a command "Error" 131 prompts a change back to the state "Idle" 20, otherwise a command "ACCh" 133 prompts a change to a state "ACCh" 30, in which AC charging for the AC battery takes place. When the AC charging has ended, a command "Idle" 132 prompts a change to the state "Idle" 20 again, or, in the event of an error, a command "Error" 130 prompts a change to the state "Idle" first. Stipulation of a mode of operation "DC_CHARGING" results in a command "DC charging" 124 prompting a change to a state "$CSC_D$" 41, in which a test on a current sensor for a charging operation for the AC battery using DC current is performed. In the event of an error, a command "Error" 141 prompts a change back to the state "Idle" 20, otherwise a command "DCCh" 144 prompts a change to a state "DCCh" 40, in which DC charging for the AC battery takes place. When the DC charging has ended, a command "Idle" 142 prompts a change to the state "Idle" 20 again, or, in the event of an error, a command "Error" 140 prompts a change to the state "Idle" 20 first. Stipulation of a mode of operation "MOTOR" results in a command "Motor" 125 prompting a change to a state "$CSC_M$" 51, in which a test relating to the motor current sensors is performed. In the event of an error, a command "Error" 151 prompts a change back to the state "Idle" 20, otherwise a further command "Motor" 153 prompts a change to a further intermediate state "CSC2 Motor" 52, which is maintained for a self-selected duration 158. Should there be an error, a command "Error" 156 prompts a change to a transition state "PErrorT" 61, in which there is preparation for the presence of an error and a change to a state "PError" 61, which has a delay with a self-selected duration 168, and finally the presence of a processor command 126 results in a change to the state "Idle" 20. Should there be no error in the state "CSC2 Motor" 52, however, then a command "Motor" 154 is used to change to a state "Motor" 50, in which for example a driving activity can be performed. When this state "Motor" 50 has ended, a command "Idle" 150 prompts a change back to the state "CSC2 Motor" 52, from which a further command "Idle" 152 can itself again prompt a change to the state "Idle" 20. However, an error can also occur in the state "Motor" 50, after which a command "Error" 165 is used to change to the state "PError" 60.

The state machine 100 is realized by a control program. A respective switching position of a respective contactor of the traction system is indicated for a respective state 10, 11, 20, 30, 31, 40, 41, 50, 51, 52, 60, 61 by the switching table of Tab. 1 and is set by the control program. For this, the control program takes account of what type of contactor S1, S2, S3, S4, S5, S9, S10, S11, S12, S13, S14 is present for the respective commands 111, 112, 121, 123, 124, 125, 126, 130, 131, 132, 133, 140, 141, 142, 144, 151, 152, 153, 154, 156, 165 relating to transitions between the respective states 10, 11, 20, 30, 31, 40, 41, 50, 51, 52, 60, 61 (see Tab. 2) and what switching times need to be observed (see Tab. 3).

Figure 2:
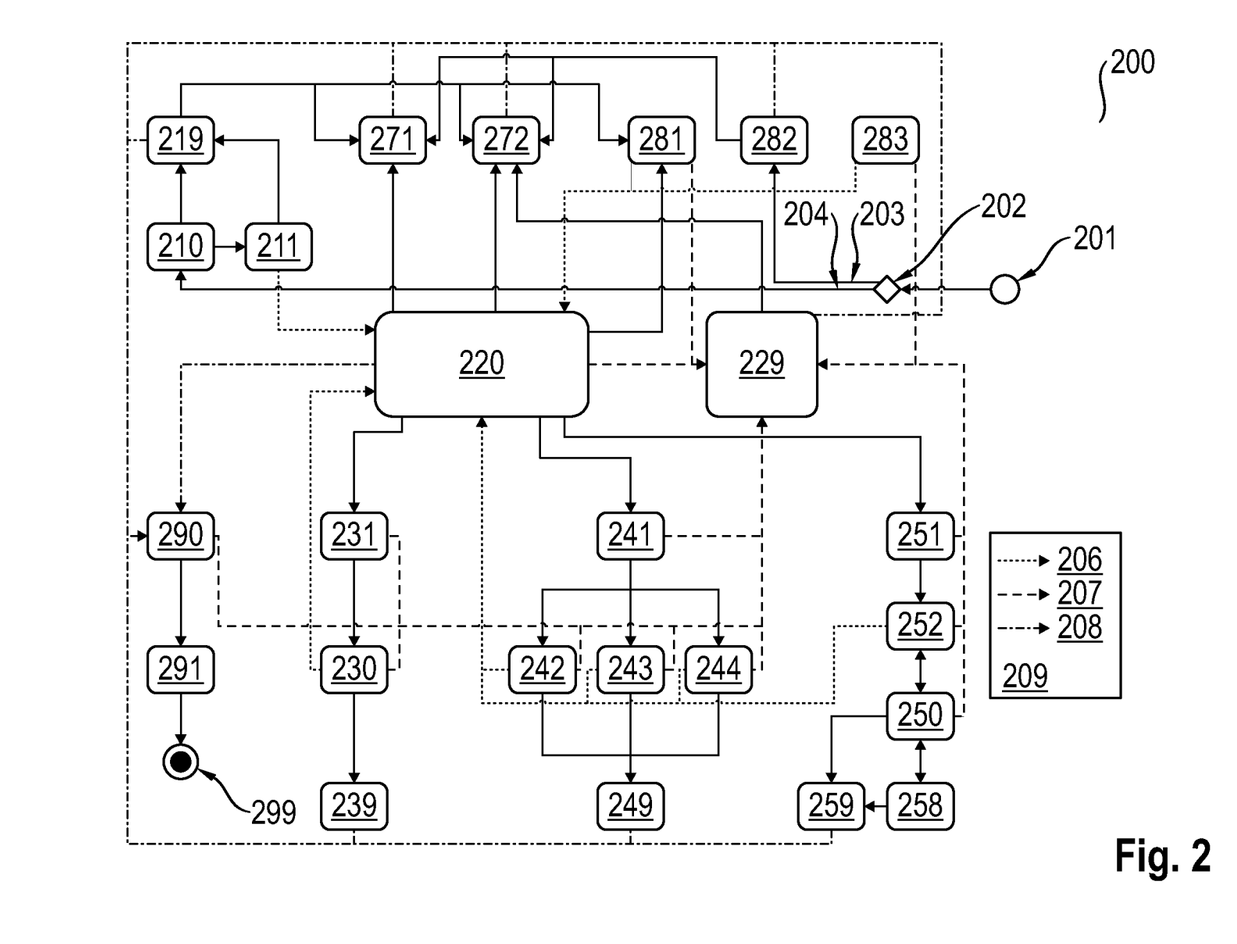
FIG. 2 shows a diagram of a meta-state machine for controlling a traction system in a further embodiment of the method according to aspects of the invention.

FIG. 2 shows a diagram of a meta-state machine 200 for controlling a traction system in a further embodiment of the method according to aspects of the invention. In a further legend 209, a dotted arrow 206 is assigned a transition to a state "IDLE" 220, a dashed arrow 207 is assigned a transition to a state "IDLE_ERROR" 229 and a dash-dot arrow 208 is assigned a transition to a state "PREPARE_SHUT-DOWN" 290. After a start 201, the meta-state machine 200 has a branch 202, in which a decision is made about a mode for debugging a single module of the AC battery of the traction system. The respective branch is taken depending on whether a variable DBG_CB_TEST_SINGLE_MODULE_IS_ENABLED is "true" 203 or "false" 204. Should the "true" branch 203 be taken, then a state "DBG_SINGLE_CB" is followed by the state "PREPARE_SHUTDOWN" 290 being reached either directly, or indirectly via a state "UPDATE_CB" 271 and a state "UPDATE_CC" 272. Should the "false" branch 204 be taken, then a power supply is initially activated in the state "PowerOnReset" 210, after which either a state "BOOT_ERROR" 219 is adopted or, after the current sensor is tested in the state "CSC$_P$" 211, the state "IDLE" 220 is reached. From the state "BOOT_ERROR" 219, the state "PREPARE_SHUTDOWN" 290 is reached either directly, or indirectly via a state "UPDATE_CB" 271 or via a state "UPDATE_CC" 272. However, there is also the possibility of a transition to a state "DBG_HSB_CMD" 281, from which the state "IDLE" 220 or "IDLE_ERROR" 229 is then reached. The latter two states 220 and 229 are also reached from a state "DBG_PMSM". From the state "IDLE_ERROR" 229, however, the state "PREPARE_SHUTDOWN" 290 is again reached directly. From the state "IDLE" 220, the states "CSC_A" 231, "ACCHG" 230 and "ACCHG_ERROR" 239 corresponding to the mode of operation for "AC_CHARGING" can be reached. Further, from the state "IDLE" 220, the states "CSC_D" 241, "DCCHG_SER" 242, "DCCHG_PAR" 243, "DCCHG_DYN" 244 and "DCCHG_ERROR" 249 corresponding to the mode of operation for "DC_CHARGING" can be reached. Additionally, from the state "IDLE" 220, the states "CSC_M" 251, "CSC2 MOTOR" 252, "MOTOR_CHECK_STOP" 258 and "MOTOR_ERROR" 259 corresponding to the mode of operation for "MOTOR" can be reached. The applicable ERROR states 239, 249, 259 all lead to the state "PREPARE_SHUTDOWN" 290, which leads to a state "SHUTDOWN" 291 and to an end 299 of the meta-state machine 200.

Figure 3:
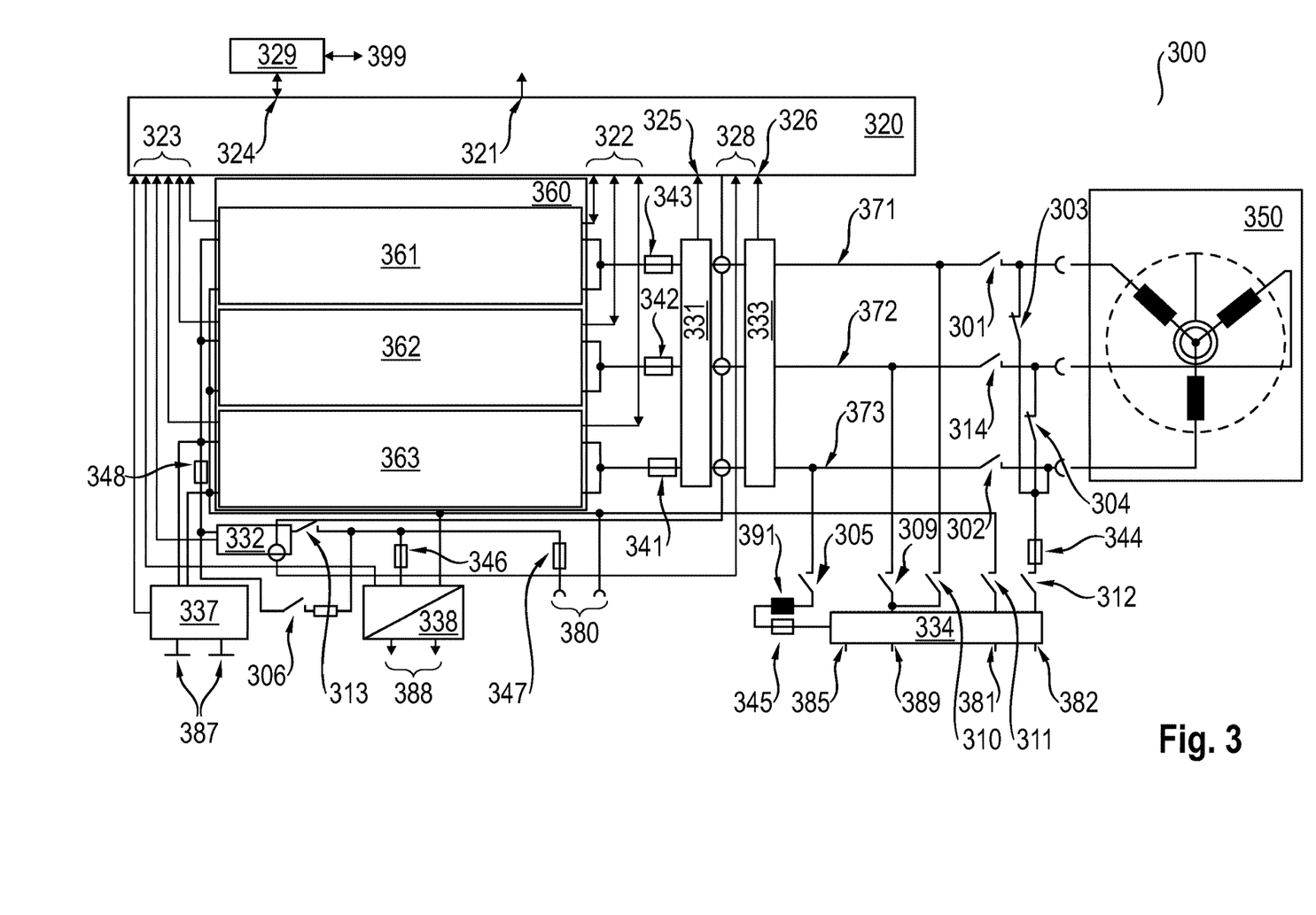
FIG. 3 shows a block diagram of a traction system in a refinement of the system according to aspects of the invention.

FIG. 3 shows a block diagram of a traction system 300 in a refinement of the system according to aspects of the invention. The traction system 300 comprises the contactors S1 301, S2 302, S3 303, S4 304, S5 305, S9 309, S10 310, S11 311, S12 312, S13 313, S14 314 actuated by an embodiment of the method according to aspects of the invention. The contactor S6 306, which the traction system 300 likewise comprises, takes on a special role here, since it is merely used to pre-charge a low-voltage supply DC-DC voltage converter and does not have a safety-relevant relationship with switching positions of the contactors S1 301, S2 302, S3 303, S4 304, S5 305, S9 309, S10 310, S11 311, S12 312, S13 313, S14 314. The traction system 300 also comprises a controller 320, which comprises a connection 321 for actuating the contactors S1 301, S2 302, S3 303, S4 304, S5 305, S9 309, S10 310, S11 311, S12 312, S13 313, S14 314, a module controller 322 for a modular multilevel converter as AC battery 360, error signal lines 323, interface 324 to the CAN gateway 329, signal input 325, phase current sensors 331, signal input 326 from phase voltage sensors 333, and a control current loop 328 for current sensors 331, 332. Further still, the traction system 300 comprises phase current sensors 331, a star point current sensor 332, phase voltage sensors 333, voltage sensors 334, an isolation watchdog 337 and a low-voltage supply DC-DC voltage converter 338, and also various fuses F1 341, F2 342, F3 343, F4 344, F5 345, F6 346, F7 347, F8 348. Continuing, the traction system 300 comprises an electric motor 350, a modular multilevel converter as AC battery 360 with controllable modules in three module strings (U module string 363, V module string 362, W module string 361) for three phases U 373, V 372 and W 271. Finally, the traction system 300 comprises an external 48 V supply 380, a connection "DC charging, negative pole" 381 and a connection "DC charging, positive pole" 382 for DC charging, an L1 line connection 385 and an N line 389 for AC charging, also vehicle ground connections 387, a 12 V vehicle electrical system connection 388, a coil 391 and a connection of the CAN gateway 329 for the vehicle CAN bus 399.

TABLE 1 switching table for the contactors

| Mode of operation | Switching sequence | S2 | S14 | S1 | S4 | S3 | S5 | S9 | S10 | S11 | S12 | S13 |
|---|---|---|---|---|---|---|---|---|---|---|---|---|
| POWER UP/ DOWN | PowerOnReset | 0 | 0 | 0 | 0 | 0 | 0 | 0 | 0 | 0 | 0 | 0 |
| | PowerOnReset->CSC$_P$ | 0 | 0 | 0 | 0 | 0 | 0 | 0 | 0 | 0 | 0 | 0 |
| | CSC$_P$->PUP = Idle | 0 | 0 | 0 | 0 | 0 | 0 | 0 | 0 | 0 | 0 | 1 |
| | Idle->PDown | 0 | 0 | 0 | 0 | 0 | 0 | 0 | 0 | 0 | 0 | 0 |
| MOTOR | Idle | 0 | 0 | 0 | 0 | 0 | 0 | 0 | 0 | 0 | 0 | 1 |
| | Idle>CSC$_M$ | 0 | 0 | 0 | 0 | 0 | 0 | 0 | 0 | 0 | 0 | 1 |
| | CSC$_M$->Motor | 0 | 0 | 0 | 1 | 1 | 0 | 0 | 0 | 0 | 0 | 1 |
| | Motor | 1 | 1 | 1 | 1 | 1 | 0 | 0 | 0 | 0 | 0 | 1 |
| | Motor->Idle | 0 | 0 | 0 | 1 | 1 | 0 | 0 | 0 | 0 | 0 | 1 |
| | Idle | 0 | 0 | 0 | 0 | 0 | 0 | 0 | 0 | 0 | 0 | 1 |
| DC CHARGING | Idle | 0 | 0 | 0 | 0 | 0 | 0 | 0 | 0 | 0 | 0 | 1 |
| | Idle->CSC$_D$ | 0 | 0 | 0 | 0 | 0 | 0 | 0 | 0 | 0 | 0 | 1 |
| | CSC$_D$->DCCh | 0 | 0 | 0 | 0 | 0 | 0 | 0 | 0 | 0 | 0 | 1 |
| | DCCh | −1 | 1 | 1 | 0 | 0 | 0 | 0 | 0 | 1 | 1 | 1 |
| | Idle | 0 | 0 | 0 | 0 | 0 | 0 | 0 | 0 | 0 | 0 | 1 |
| AC | Idle | 0 | 0 | 0 | 0 | 0 | 0 | 0 | 0 | 0 | 0 | 1 |

TABLE 1-continued switching table for the contactors

| Mode of operation | Switching sequence | S2 | S14 | S1 | S4 | S3 | S5 | S9 | S10 | S11 | S12 | S13 |
|---|---|---|---|---|---|---|---|---|---|---|---|---|
| CHARGING | Idle->$CSC_A$ | 0 | 0 | 0 | 0 | 0 | 0 | 0 | 0 | 0 | 0 | 1 |
|  | $CSC_A$->ACCh | 0 | 0 | 0 | 0 | 0 | 0 | 0 | 0 | 0 | 0 | 1 |
|  | ACCh | −1 | 1 | 1 | 0 | 0 | 1 | 1 | 1 | 0 | 0 | 1 |
|  | Idle | 0 | 0 | 0 | 0 | 0 | 0 | 0 | 0 | 0 | 0 | 1 |
| ERROR | if(S4 or S3) = 1) | x | x | x | 1 | 1 | x | x | x | x | x | 1 |
|  | prepare Error State | 0 | 0 | 0 | 1 | 1 | 0 | 0 | 0 | 0 | 0 | 1 |
|  | Init = Final Error State | 0 | 0 | 0 | 0 | 0 | 0 | 0 | 0 | 0 | 0 | 1 |
|  | if(S4 or S3) = 0) | x | x | x | 0 | 0 | x | x | x | x | x | 1 |
|  | Init = Final Error State | 0 | 0 | 0 | 0 | 0 | 0 | 0 | 0 | 0 | 0 | 1 |

TABLE 2 contactor types used

| Function | Normally open/closed | Contactor number | Contactor type |
|---|---|---|---|
| Motor phase U | NO | 2 | GX14NO |
| Motor phase V | NO | 14 | GX14NO |
| Motor phase W | NO | 1 | GX14NO |
| Active shorting, motor phase U/V | NC | 4 | HXNC241 |
| Active shorting, motor phase U/W | NC | 3 | HXNC241 |
| AC charging, L1 -> U | NO | 5 | P115 |
| AC charging, N -> V | NO | 9 | P115 |
| AC charging, N -> W | NO | 10 | P115 |
| DC charging, negative pole | NO | 11 | P115 |
| DC charging, positive pole | NO | 12 | P115 |
| Star point contactor | NO | 13 | EVC135 |

TABLE 3 table of switching times

| Contactor type | t_on_max | t_off_max |
|---|---|---|
| P115 | 25 ms | 8 ms |
| GX14NO | 20 ms | 12 ms |
| HXNC241 | 20 ms | 20 ms |
| EVC135 (15.3 ohms) | 25 ms | 10 ms |

LIST OF REFERENCE SIGNS

100 State machine for contactor actuation
4 Transition due to command
5 Transition due to IP core
6 Stable state
7 Transition state
8 Blocked delay state of self-selected duration
9 Legend
10 PowerOnReset
11 $CSC_P$: power current sensor test
20 Idle
30 ACCh: AC charging
31 $CSC_A$: AC current sensor test
40 DCCh: DC charging
41 $CSC_D$: DC current sensor test
50 Motor
51 $CSC_M$: motor current sensor test
52 CSC2 motor
60 60 PError: Prepare Error State
61 PErrorT: transition state for Prepare Error State
101 Input action
111 PowerUp (or idle)
112 PowerUp (or idle)
121 PowerDown
123 ACCh: AC charging command
124 DCCh: DC charging command
125 Motor
126 Transition caused by IP core
130 Error
131 Error
132 Idle
133 ACCh
140 Error
141 Error
142 Idle
144 DCCh
150 Idle
151 Error
152 Idle
153 Motor
154 Motor
156 Error
158 Delay
165 Error
168 Delay
200 Meta-state machine
201 Start
202 Branch
203 Branch DBG_CB_TEST_SINGLE_MODULE_IS_ENABLED true
204 Branch DBG_CB_TEST_SINGLE_MODULE_IS_ENABLED false
206 Transition arrow for IDLE
207 Transition arrow for IDLE_ERROR
208 Transition arrow for PREPARE_SHUTDOWN
209 Legend
210 PowerOnReset
211 CSC_P
219 BOOT_ERROR
220 IDLE
229 IDLE_ERROR
230 ACCHG
231 CSC_A
239 ACCHG_ERROR
241 CSC_D
242 DCCHG_SER
243 DCCHG_PAR
244 DCCHG_DYN
249 DCCHG_ERROR
250 MOTOR
251 CSC_M
252 CSC2 MOTOR
258 MOTOR_CHECK_STOP
259 MOTOR_ERROR 271 UPDATE_CB
272 UPDATE_CC
281 DBG_HSB_CMD
282 DBG_SINGLE_CB
283 DBG_PMSM
290 PREPARE_SHUTDOWN
291 SHUTDOWN
299 End
300 Traction system
301 Contactor $S_1$
302 Contactor $S_2$
303 Contactor $S_3$
304 Contactor $S_4$
305 Contactor $S_5$
306 Contactor $S_6$
309 Contactor $S_9$
310 Contactor $S_{10}$
311 Contactor $S_{11}$
312 Contactor $S_{12}$
313 Contactor $S_{13}$
314 Contactor $S_{14}$
320 Controller
321 Connection for actuating contactors
322 Module controller for multilevel converter
323 Error signal lines
324 Interface to the CAN gateway
325 Signal input, phase current sensors
326 Signal input, phase voltage sensors
328 Control current loop, current sensors
329 Gateway
331 Phase current sensors
332 Star point current sensor
333 Phase voltage sensors
334 Voltage sensors
337 Isolation watchdog
338 Low-voltage supply DC-DC voltage converter
341 Fuse $F_1$
342 Fuse $F_2$
343 Fuse $F_3$
344 Fuse $F_4$
345 Fuse $F_5$
346 Fuse $F_6$
347 Fuse $F_7$
348 Fuse $F_8$
350 Electric motor
360 AC battery: modular multilevel converter
361 W module string
362 V module string
363 U module string
371 Phase W
372 Phase V
373 Phase U
380 External supply 48 V
381 DC charging, negative pole
382 DC charging, positive pole
385 AC charging, L1 line
387 Vehicle ground connections
388 12 V vehicle electrical system connection
389 N line
391 Coil
399 Vehicle CAN bus

What is claimed is:

1. A method for actuating contactors in a traction system, in which the traction system comprises (i) an AC battery, (ii) an electric motor, (iii) at least one peripheral unit, (iv) a plurality of voltage and current sensors, (v) a plurality of contactors, which are arranged in electrical connections to the AC battery and to the electric motor and to the at least one peripheral unit, and (vi) a controller having a hardware-programmable processor unit on which a control program for actuating the contactors is configured at the start of operation and, after the configuration, a fixed semiconductor circuit structure relating to the actuation of the contactors is available to the processor unit, wherein the traction system has multiple modes of operation, wherein a respective mode of operation is predefined by a general vehicle controller, wherein a respective mode of operation has a plurality of states formed by at least one respective target state and at least one intermediate state, the method comprising:

adopting a respective state by the traction system by a respective command as a result of a respective transition between the respective states, assigning the traction system a respective switching position of the contactors for the respective state in a switching table, storing a closing duration and an opening duration for a respective contactor in a table of switching times, reaching the respective state by means of a sequence firmly predefined by a state machine, wherein the state machine is realized by the control program, and controlling the contactors by the control program according to the switching table using the table of switching times.

2. The method as claimed in claim 1, further comprising selecting the modes of operation with the respective target state and at least one respective intermediate state from at least the following list: mode of operation "POWER_UP_DOWN" with target state "Idle" after prior intermediate state "Power sensor check", mode of operation "MOTOR" with target state "Motor" after prior "Motor sensor check", mode of operation "DC_CHARGING" with target state "DC charging" after prior "DC power sensor check", mode of operation "AC_CHARGING" with target state "AC charging" after prior "AC power sensor check", mode of operation "ERROR" with target state "Init" after prior intermediate state "Idle Error", and/or mode of operation "SHUTDOWN" with target state "Off" after prior intermediate state "PowerDown".

3. The method as claimed in claim 1, further comprising selecting the at least one peripheral unit from the following list: isolation watchdog, low-voltage DC-DC voltage converter, charging connector, and/or CAN bus.

4. The method as claimed in claim 1, in which the processor unit chosen is an FPGA, and in which the state machine is realized on the FPGA as a hardware program by the control program using a VHDL module.

5. The method as claimed in claim 1, in which the hardware-programmable processor unit comprises at least one additional microprocessor core on which a meta-state machine, which is on a higher level than the state machine realized by the hardware-programmed control program, is executed as software.

6. The method as claimed in claim 1, further comprising configuring the control program for actuating the contactors by a program loader on the hardware-programmable processor unit at the start of operation.

7. A system for actuating contactors in a traction system, the traction system comprising:
- an AC battery,
- an electric motor,
- at least one peripheral unit,
- a plurality of voltage and current sensors,
- a plurality of contactors, which are arranged in electrical connections to the AC battery and to the electric motor and to the at least one peripheral unit, and
- a controller having a hardware-programmable processor unit, wherein the hardware-programmable processor unit is designed to configure a control program for actuating the contactors at the start of operation, as a result of which, after the configuration, a fixed circuit structure relating to the actuation of the contactors is available to the processor unit,
- wherein the traction system has multiple modes of operation, wherein a respective mode of operation is predefined by a general vehicle controller, wherein a respective mode of operation has a plurality of states that are formed by at least one respective target state and at least one intermediate state, wherein a respective state from the plurality of states is adoptable by the traction system by a respective command as a result of a respective transition between the respective states,
- wherein the traction system is assigned a respective switching position of the contactors for the respective state in a switching table,
- wherein a closing duration and an opening duration are stored for a respective contactor in a table of switching times,
- wherein the respective state is reachable by a sequence firmly predefined by a state machine, wherein the state machine is realized by the control program, and wherein the contactors are controllable by the control program according to the switching table using the table of switching times.

8. The system as claimed in claim 7, in which the modes of operation with the respective target state and at least one respective intermediate state are chosen from at least the following list: mode of operation "POWER_UP_DOWN" with target state "Idle" after prior intermediate state "Power sensor check", mode of operation "MOTOR" with target state "Motor" after prior "Motor sensor check", mode of operation "DC_CHARGING" with target state "DC charging" after prior "DC power sensor check", mode of operation "AC_CHARGING" with target state "AC charging" after prior "AC power sensor check", mode of operation "ERROR" with target state "Init" after prior intermediate state "Idle Error", and/or mode of operation "SHUTDOWN" with target state "Off" after prior intermediate state "PowerDown".

9. The system as claimed in claim 7, in which the at least one peripheral unit comprises:
- isolation watchdog, low-voltage DC-DC voltage converter, charging connector, and/or CAN bus.

10. The system as claimed in claim 7, wherein the processor unit is an FPGA, and the state machine is realized on the FPGA as hardware by the control program using a VHDL module.

11. The system as claimed in claim 7, wherein the hardware-programmable processor unit comprises at least one additional microprocessor core on which a meta-state machine, which is on a higher level than the state machine realized by the hardware-programmed control program, is executable as software.

12. The system as claimed in claim 7, in which the system additionally comprises a program loader, wherein the program loader is designed to configure the control program for actuating the contactors on the hardware-programmable processor unit at the start of operation.

* * * * *